(12) United States Patent
Lerch

(10) Patent No.: US 7,429,189 B2
(45) Date of Patent: Sep. 30, 2008

(54) ELECTRICAL EXTENSION LEAD

(75) Inventor: Oliver Lerch, Mainz (DE)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 10/660,241

(22) Filed: Sep. 11, 2003

(65) Prior Publication Data

US 2004/0087207 A1    May 6, 2004

(30) Foreign Application Priority Data

Sep. 11, 2002  (GB) ................... 0220994.8

(51) Int. Cl.
*H01R 11/00*  (2006.01)
(52) U.S. Cl. ..................... 439/502; 320/105
(58) Field of Classification Search ......... 439/501–505, 439/15, 164; 320/105, 113, 115; 174/79 R, 174/113 R, 65 R, 79
See application file for complete search history.

(56) References Cited

U.S. PATENT DOCUMENTS

| | | | | | |
|---|---|---|---|---|---|
| 4,079,304 | A | * | 3/1978 | Brandenburg | ............... 320/105 |
| 4,215,306 | A | | 7/1980 | Mace | |
| 4,389,608 | A | | 6/1983 | Dahl et al. | |
| 4,466,581 | A | * | 8/1984 | Hill | ......... 242/388.1 |
| 4,558,270 | A | * | 12/1985 | Liautaud et al. | ............ 320/110 |
| 4,597,620 | A | * | 7/1986 | Lindner et al. | .............. 439/277 |
| 4,647,139 | A | | 3/1987 | Yang | |
| 4,666,232 | A | * | 5/1987 | Shyu | ......... 439/578 |
| 4,893,037 | A | * | 1/1990 | Schwartz | .............. 310/68 B |
| 4,983,344 | A | * | 1/1991 | Brown | ......... 264/255 |
| 5,006,073 | A | * | 4/1991 | Mennona, Jr. | ............ 439/77 |
| 5,011,426 | A | * | 4/1991 | Colleran et al. | ............ 439/357 |
| 5,144,217 | A | | 9/1992 | Gardner | |
| 5,220,152 | A | * | 6/1993 | Doran | ......... 219/201 |
| 5,689,171 | A | * | 11/1997 | Ludewig | ............ 320/110 |
| 5,720,628 | A | * | 2/1998 | Usui et al. | .............. 439/502 |
| 5,866,076 | A | * | 2/1999 | Fencl et al. | ............ 422/121 |
| 5,923,146 | A | * | 7/1999 | Martensson | .............. 320/111 |
| 5,923,174 | A | * | 7/1999 | Darling, Jr. | .............. 324/637 |
| 5,982,138 | A | * | 11/1999 | Krieger | ............ 320/105 |
| 6,127,803 | A | * | 10/2000 | Wang et al. | ............ 320/114 |
| 6,230,860 | B1 | * | 5/2001 | Wu | ......... 191/12.2 R |
| 6,296,367 | B1 | * | 10/2001 | Parsons et al. | ............ 362/183 |
| 6,346,006 | B1 | * | 2/2002 | Smith | ............ 439/501 |
| 6,428,181 | B1 | | 8/2002 | Moriarty | |

(Continued)

FOREIGN PATENT DOCUMENTS

DE    4405391 A    9/1994

(Continued)

*Primary Examiner*—Renee S Leubke
*Assistant Examiner*—Iarisa Tsukerman
(74) *Attorney, Agent, or Firm*—Michael P. Leary; Adan Ayala

(57) ABSTRACT

An electrical extension lead comprising: an electrical cable having a first end connected to a plug socket arrangement for supplying electrical to electrical devices, and a second end connected to an electrical plug for connection to an electrical mains supply, a battery pack charging assembly also connected to the first end of the cable and a battery pack for use with an electrical devices is removably connectable to the battery pack charging assembly for charging, and wherein the plug socket arrangement and the battery pack charging assembly are mounted within a common housing.

21 Claims, 3 Drawing Sheets

U.S. PATENT DOCUMENTS

| | | | |
|---|---|---|---|
| 6,452,108 B1 * | 9/2002 | Major | 174/135 |
| 6,490,186 B2 | 12/2002 | Cho | |
| 6,589,069 B1 * | 7/2003 | Liao | 439/501 |
| 6,604,957 B2 * | 8/2003 | Comini | 439/417 |
| 6,926,130 B2 * | 8/2005 | Skowronski | 191/12.2 R |
| 2005/0017117 A1 * | 1/2005 | Moon et al. | 242/390.8 |

FOREIGN PATENT DOCUMENTS

| | | |
|---|---|---|
| DE | 199 45 994 A | 6/2000 |
| GB | 236916 A | 1/2002 |
| JP | 4-112468 A | 4/1992 |
| JP | 3037182 U | 2/1997 |
| JP | 11224506 | 8/1999 |
| JP | 2001-307835 A | 11/2001 |
| JP | 2002-226143 A | 8/2002 |

\* cited by examiner

ELECTRICAL EXTENSION LEAD

This invention relates generally to electrical extension leads, in particular of the type which are wound on a drum or reel.

BACKGROUND OF THE INVENTION

Electrical extension leads have a cable with an electrical plug at one end of the cable for connection, for example to a plug socket of an electrical supply source, such as a mains supply or a fuel, eg. petrol, powered generator supply. Where the extension cable is wound on a drum, the other end of the cable is electrically connected to at least one plug socket assembly located on the drum. Then when a user wishes to use an electrical appliance, for example a power tool, in a location remote from the plug socket of the electrical supply source, the one end of the cable is connected via the plug to said plug socket and a suitable length of cable is unwound form the drum. Then a plug at the end of the electrical cable of the power tool is plugged into the plug socket arrangement of the drum and the power tool can be used in the remote location.

Not all power tools are powered by connecting them to an electrical supply source, for example the mains, but instead are powered by battery packs. When conducting a job at a location remote from, for example a mains supply, there are situations when a user will use mains powered and battery powered tools to complete the job. For example, a user may need to use a mains powered saw and a battery powered drill. Where battery powered tools are being used in such a location the batteries have to be recharged, generally by a battery charger connected to the remote mains source.

BRIEF SUMMARY OF THE INVENTION

The present invention aims to provide a more convenient arrangement for charging batteries when working at a location remote from a electrical supply source.

According to the present invention there is provided an electrical extension lead, comprising an electrical cable having a first end and a second end, having the first end connected to a plug socket arrangement for supplying electricity to electrical devices, and with the second end connected to an electrical plug for connection to an electrical supply source, for example a mains or generator supply source, characterised in that a battery pack charging assembly is also connected to the first end of the cable, which charging assembly is suitable for charging battery packs for powering electrical devices.

Therefore, according to the present invention a person working at a location remote from an electrical supply source, for example the mains, and using an electrical extension lead, is able to charge batteries in situ, ie. at the location in which he or she is working, during the entire time during which the plug of the extension lead is electrically connected to the mains supply. While a mains powered device, for example a power tool, being powered via the electrical extension lead is being used, a battery pack can be charged. Then when it is desired to use a battery powered device for the job in hand, the user has a charged battery pack to hand. The battery pack being charged could be the only battery pack for the battery powered device, or it could be a spare which is being charged while a second battery pack is being used to power the device.

It is preferred that the plug socket arrangement and the battery pack charging assembly are co-located so as to make the electrical extension lead easily portable and compact. It is especially preferred that the plug socket arrangement and the battery pack charging assembly are mounted within a common housing arrangement.

For convenient storage and deployment the cable may be stored by wrapping it around a storage structure, which storage structure is part of the extension lead. This reduces the time to deploy the cable, as the cable is less likely to become tangled if stored by being wrapped around a storage structure. The storage structure may comprise a housing configured as a reel, around which the cable can be wrapped. Where such a storage structure is used, the plug socket assembly and the battery pack charging assembly are preferably mounted on the storage structure. This reduces the number of separate parts required for storage and use of the extension lead according to the present invention.

For a particularly compact arrangement the cable is stored by wrapping it around the exterior surface of a hollow storage structure and the battery pack charging assembly is located within said hollow storage structure. In a preferred arrangement, the plug socket assembly is fitted within a cover portion at a first end of the hollow storage structure and the battery pack charging assembly is fitted within a cover portion at a second opposite end of the hollow storage structure. The second cover portion may be formed as the walls of a recess, which recess extends within the hollow storage structure and within which recess the battery pack charging assembly is mounted. In a preferred arrangement the hollow storage structure is substantially cylindrical.

The storage structure around which the cable is wrapped may be rotatably mounted within an outer housing, which outer housing is formed with a hole through which the cable (8) is extendable. Thus, in order to deploy that cable, the storage structure is rotated with respect to the outer housing in a first direction in order to unwrap the cable from the storage structure. Then to store the cable, after use, the storage structure is rotated with respect to the outer housing in a second opposite direction in order to re-wrap the cable around the storage structure.

The battery pack charging assembly generally comprises a receptacle assembly for receiving a battery pack, which receptacle assembly comprises a receptacle housing and a flexible, preferably elastomeric, gasket disposed between the receptacle housing and a portion of the extension lead housing. The use of the elastomeric gasket damps any vibration from the extension lead housing, if for example, the extension lead housing is dropped, in order to protect the receptacle assembly and any battery pack mounted within it from damage. Preferably, the receptacle assembly further comprises at least one retainer disposed on the extension lead housing to prevent disengagement of the gasket.

A door located adjacent the receptacle assembly can be hingably connected to the extension lead housing in order to cover the receptacle assembly. The door preferably has a spring disposed on it to bias a battery disposed in the receptacle assembly towards a connecting position. Generally, the battery charger circuitry is mounted on the receptacle housing.

BRIEF DESCRIPTION OF THE DRAWINGS

The accompanying drawings illustrate preferred embodiments of the invention according to the practical application of the principles thereof, and in which.

DETAILED DESCRIPTION OF THE INVENTION

Figure 1:
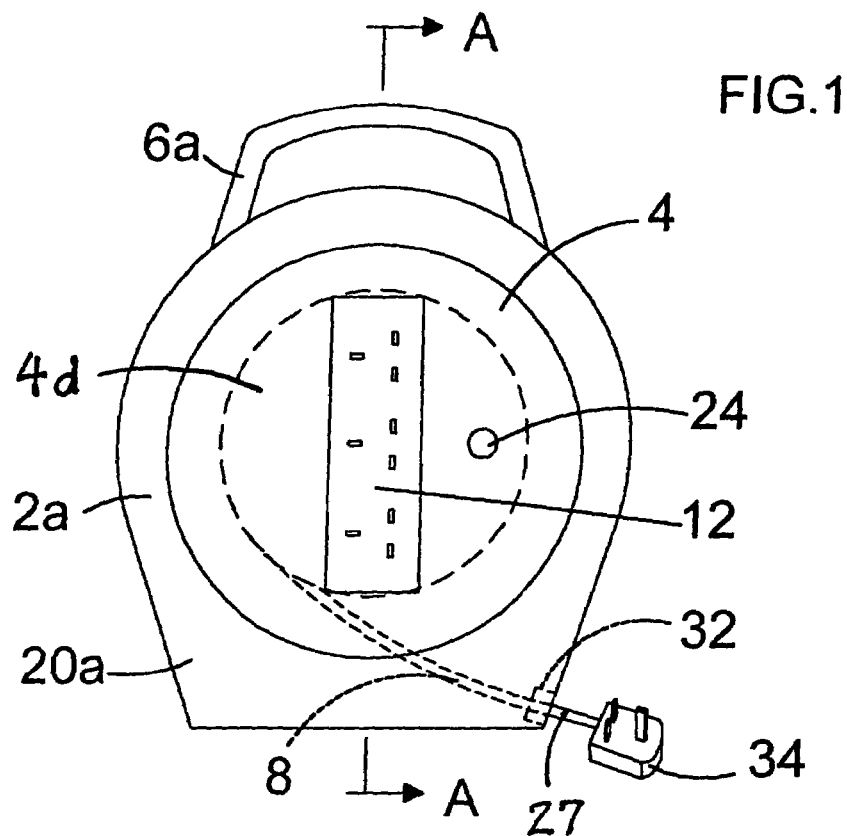
FIG. 1 is a front elevational view of an electrical extension lead according to the present invention.
Figure 2:
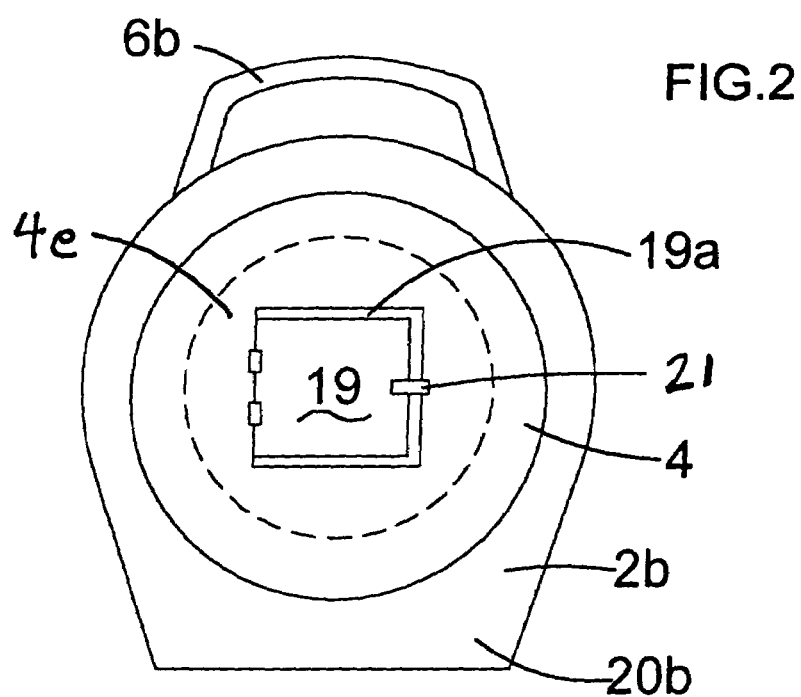
FIG. 2 is a rear elevational view of the extension lead of FIG. 1.
Figure 3:
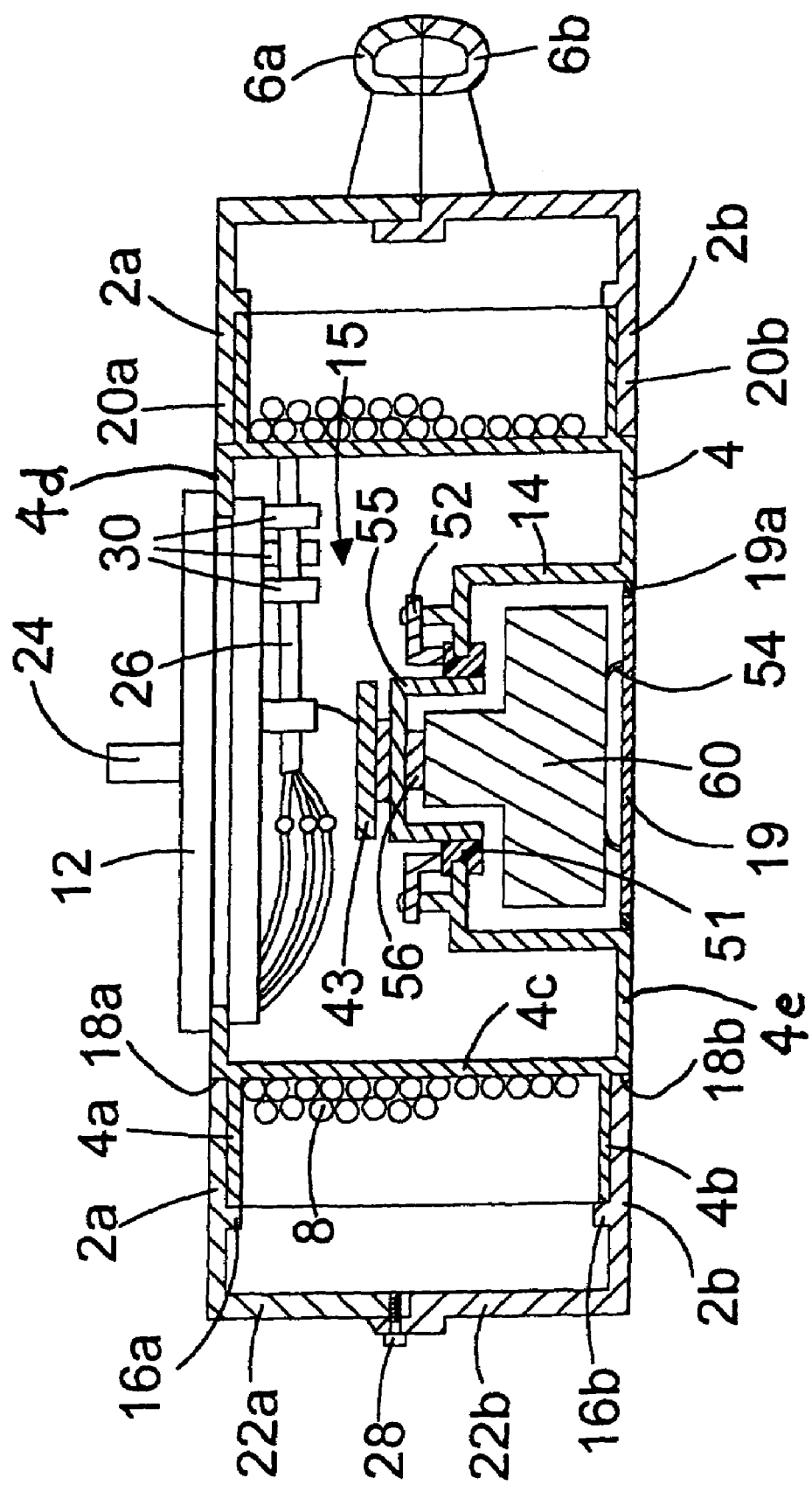
FIG. 3 is a cross-section through the line AA of FIG. 1.

The cable drum arrangement shown in FIGS. 1 to 3 has a two part clamshell housing (2a) and (2b) within which a storage structure, such as a reel housing (4) is mounted. Each clamshell half has an annular wall (20a, 20b) (the forward or rearward side of the clamshell housing) with a peripheral annular side wall (22a, 22b). Each side wall extends substantially at right angles to the associated annular wall. Each annular wall (20a, 20b) of the clamshell halves has a central recess within which the reel housing (4) is sandwiched by fixing the edges of the side walls (22a, 22b) remote from the annular walls (20a, 20b) together, for example, using screws (28). Each clamshell half is formed with a respective half of a handle (6a, 6b) by which the cable drum can be carried and hung on a hook for storage. The reel housing (4) has a central cylindrical body (4c), about which a cable (8) is wound or wrapped and at the ends of the cylindrical body (4c) are formed annular flanges (4a) and (4b). A first end of the cylindrical body (4a) has a first cover portion (4d) formed with a through hole for receiving a plug socket assembly (12). The second opposite end of the cylindrical body (4c) has a second cover portion (4e) formed with a recess (14) for receiving a battery charging assembly (15) and a battery (60).

The reel housing (4) is received between the clamshell housing parts (2a, 2b) so as to be able to rotate with respect to the clamshell housing. Each clamshell half is formed on the internal surface of its annular wall (20a, 20b) with an annular rib (16a, 16b) which fits around the associated annular flange (4a, 4b). The reel housing (4) is formed with an external annular shoulder (18a, 18b) at each end of the cylindrical body (4a) against which a radially inward portions of the annular walls (20a, 20b) abut. The reel housing (4) is formed with a handle (24), located eccentrically with respect to the rotational axis of the reel housing (4), on the cover portion (4d) of the reel housing in which the plug socket assembly (12) is mounted. This handle (24) can be gripped by a user to facilitate relative rotation between the reel housing (4) and the clamshell housing (2a, 2b).

Figure 4:
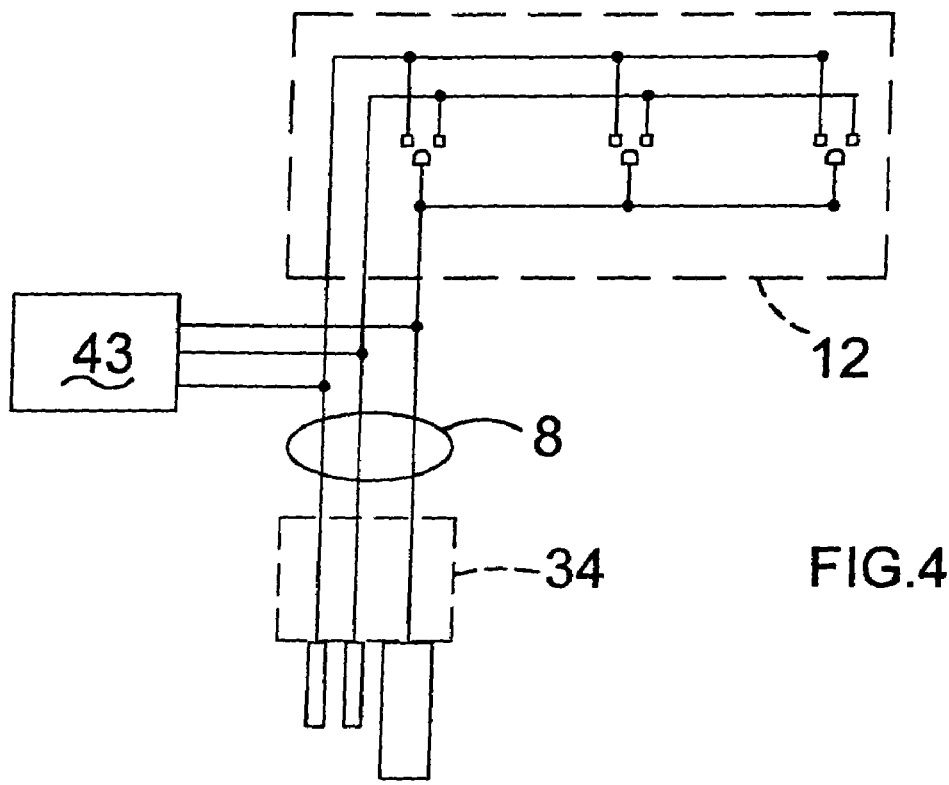
FIG. 4 is a schematic diagram of the circuitry for the extension lead of FIG. 1.

A cable (8) is connected at a first end (26) to the plug socket assembly (12) and to the battery charging assembly (15). The cable is wound around the outside of the cylindrical body (4c) of the reel housing (4) between the two flanges (4a, 4b). The first end of the cable (26) is secured in place by pegs (30) depending from the inside facing surface of the plug socket assembly (12) between which pegs (30) the first end (26) of the cable (8) is secured. The second opposite end (27) of the cable (8) extends through a hole (32) in the clamshell housing (2a, 2b) and has an electrical plug (34) electrically connected to it. A desired length of the cable (8) can be drawn out of the hole (32) in the clamshell housing (2a, 2b) by a relative rotation of the reel housing (4) to the clamshell housing (2a, 2b). The electrical circuitry for the extension lead is shown in FIG. 4. The cable (8) has neutral, live and earth wires, which are connected at the first end (26) of the cable to the neutral, live and earth connectors, respectively of three plug sockets of the plug socket arrangement (12) in a conventional manner.

The recess (14) in the cover portion (14e) of the reel housing (4) remote from the plug socket assembly (12) has a door (19) pivotally attached thereto, providing access to recess (14) and allowing an operator to install a battery pack (60) within reel housing (4). The door (19) may be kept in a closed position by a latch (21). Preferably, latch (21) comprises an overcenter mechanism. Door (19) may have a gasket (19a) disposed thereon to limit the ingress of water into, if not wholly waterproof, recess (14). Preferably gasket (19a) is made of rubber or an elastomeric material.

Preferably, the recess (14) is designed to receive a battery pack (60) via a connector (56). The connector (56) has a configuration appropriate to contact the battery terminals. Preferably the battery pack terminals and connector (56) will be arranged in the manner disclosed in U.S. Pat. No. 5,144, 217, which is hereby incorporated in whole by reference.

A battery charger circuit (43) is electrically connected to the connector (56). The connector (56) and the charger circuitry (43) are mounted on a floating receptacle housing (55). They are mounted on the floating receptacle housing (55), to minimize the shock received by the battery pack (60) and the circuitry (43) if the cable drum is dropped. Charger circuitry (43) allows charging of battery packs having different voltages, as is well known in the art. The receptacle housing (55) may be flexibly connected to the walls of the recess (14) via a flexible gasket (51). Preferably, gasket (51) is generally annular and made of a flexible, resilient material, such as rubber or elastomer. Retainers (52) may be installed on the walls of the recess (14) to prevent the disengagement of gasket (51) and the walls of the recess (14) when pushing the battery pack (60) in place. Retainers (52) may be attached to walls of the recess (14) via screws and may have a generally annular form.

A spring (54) may also be provided on door (19) to bias battery pack (60) into connection with connector (56). Preferably spring (54) will be flexible enough to bias battery packs having different sizes.

Referring to FIG. 4, the charger circuitry (43) is connected to the mains power supply (40) via the cable (8) and plug (34). When the plug (34) is connected to an electrical supply source (40), for example a mains power supply, power is provided to the charger circuit (43) in order to charge battery pack (60). While the battery pack (60) is being charged the plug sockets of the plug socket assembly (12) are still available for use to power up to three electrically powered device, such as power tools. With such an extension lead arrangement, for example, a user can charge a battery pack by disposing the battery pack (60) in the charger assembly (15), providing power to the battery pack (60), and then removing the battery pack (60) from the charger assembly (15), while using a first powered power tool, such as a saw, plugged into the plug socket arrangement (12) of the extension lead. The charged battery pack (60) can then be inserted into a battery powered power tool, such as drill for a user to continue with the job in hand. In other words, the user can use the extension lead for powering electrical devices, while charging the battery pack (60).

Figure 5:
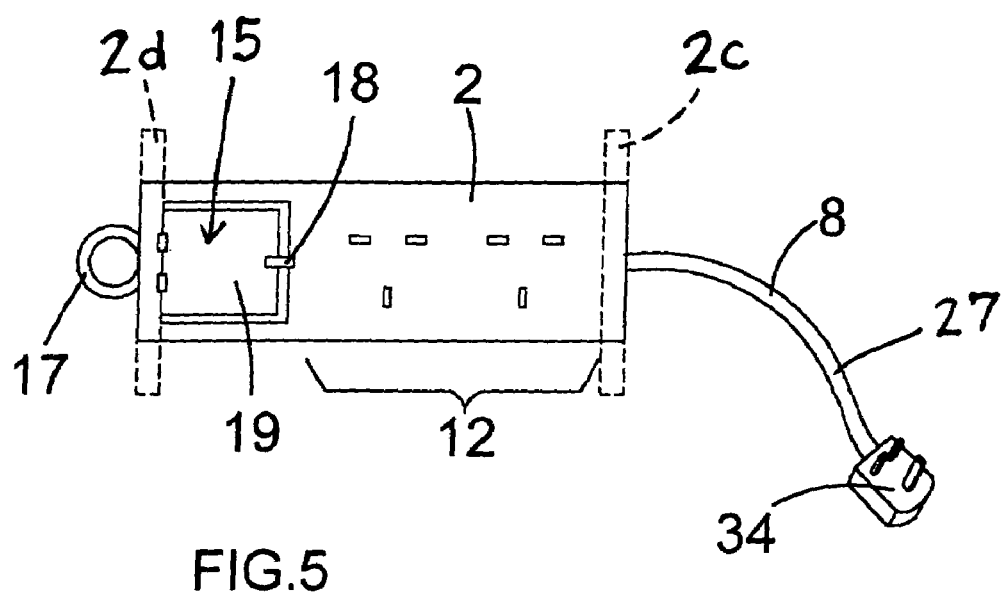
FIG. 5 is a plan view of a second embodiment of an electrical extension lead according to the present invention.

FIG. 5 shows a second embodiment of the present invention, with like parts identified by like numerals. The electrical circuitry of the FIG. 5 embodiment is the same as that shown in FIG. 4, but with one plug socket removed. In the FIG. 5 embodiment the electrical extension lead has a housing (2) formed from upper and lower clamshell halves, the upper one of which can be seen in FIG. 5. The housing (2) houses a plug socket arrangement (12) comprising two plug sockets. The housing (2) also houses a battery pack charging assembly (15), located in a recess behind the door (19), which door (19) is secured shut by a latch arrangement (21). The battery pack charging assembly (15), could for example be identical to that shown in FIG. 3. A cable (8) extends from the housing (2) and the end of the cable (8) remote from the housing has a plug (34) electrically connected to it. When the plug (34) is electrically connected to an electrical supply source (40), such as a generator or mains supply, up to two electrically powered devices can be plugged into the sockets of the socket arrangement (12) in order to power the electrically powered devices.

In addition a battery pack (60) can be inserted into the battery pack charging assembly (15) of the electrical extension lead of FIG. 5, in order to simultaneously charge the battery pack for later use on a battery powered device. When the electrical extension lead of FIG. 5 is stored, the cable (8) can be wound around a forearm of a user and hung on a hook, with the housing (2) also hung on the hook via hanging loop (17). Alternatively, the housing (2) could be provided with flanges (2c, 2d) (shown in dotted lines) and the cable (8) could be wrapped or wound around the housing (2) between the flanges (2c, 2d). The housing (2) with the cable (8) wrapped around it could then be stored by hanging the housing (2) on a hook via hanging loop (17).

The invention claimed is:

1. An electrical extension lead, comprising a storage structure and an electrical cable having a first end and a second end, the first end connected to a plug socket arrangement mounted on the storage structure and arranged for supplying AC electricity to electrical devices, and the second end connected to an electrical plug for connection to AC electrical supply sources, characterized in that a battery pack charging assembly is also connected to the first end of the cable and mounted on the storage structure, which charging assembly includes a receptacle comprising a receptacle housing and a flexible gasket disposed between the receptacle housing and a portion of the storage structure for holding and charging removable battery packs for powering electrical devices, and the storage structure includes a door located adjacent the receptacle assembly and a reel housing and the cable is stored by wrapping it around the storage structure.

2. An electrical extension lead according to claim 1 and further including a hollow storage structure and the battery pack charging assembly is located within said hollow storage structure.

3. An electrical extension lead according to claim 2 wherein the plug socket arrangement is fitted within a first cover portion of the hollow structure and the battery pack charging receptacle is fitted within a second cover portion at the opposite end of the hollow structure.

4. An electrical extension lead according to claim 3 wherein the second cover portion includes a recess, which recess extends within the hollow storage structure and the battery pack charging receptacle is fitted within the recess.

5. An electrical extension lead according to claim 2 wherein the hollow storage structure is substantially cylindrical.

6. An electrical extension lead according to claim 1 wherein the storage structure is rotatably mounted within an outer housing, which outer housing is formed with a hole through which the cable is extendable.

7. An electrical extension lead according to claim 1, wherein the receptacle assembly further comprises at least one retainer disposed on the storage structure to prevent disengagement of the gasket.

8. An electrical extension lead according to claim 1, wherein the door includes a spring disposed thereon to bias a battery into connection with the receptacle assembly.

9. An electrical extension lead according to claim 1 further including a battery charger circuit mounted on the receptacle housing.

10. An electrical extension cord assembly for conducting AC power from an AC mains electrical source to a corded electrical device, the electrical extension cord assembly comprising:
an AC electrical cable having a first end and a second end;
an AC electrical plug connected to the first end of the AC electrical cable for connection to the AC mains electrical source;
a housing located proximate to the second end of the AC electrical cable and including a cord storage structure connected to the housing and arranged for holding a portion of the AC electrical cable in a coil, and the housing defines a recess;
a plug socket arrangement structurally mounted to the housing and connected proximate to the second end of the AC electrical cable and suitable for electrically connecting to the corded electrical device;
a battery charging assembly structurally mounted to the housing and connected proximate to the second end of the AC electrical cable and suitable for charging the battery pack of cordless electrical devices, and the battery charging assembly includes a connector located within the recess; and,
a door mounted to the housing and movable between an open position, wherein the recess is open for access, and a closed position, wherein the recess is closed.

11. An electrical extension cord assembly according to claim 10, wherein the cord storage structure includes a reel on which the AC electrical cable is coiled.

12. An electrical extension cord assembly according to claim 11 wherein the reel is rotatably mounted to the housing and the AC electrical cable is drawn onto the reel by rotation of the reel.

13. An electrical extension cord assembly according to claim 10 wherein the housing includes a lifting handle.

14. An electrical extension cord assembly according to claim 10 wherein the door is pivotably attached to the housing for movement between the open position and the closed position.

15. An electrical extension cord assembly according to claim 14 and further comprising a latch for holding the door in the closed position.

16. An electrical extension cord assembly according to claim 10 and further comprising a gasket attached to one of the housing and the door for sealing a joint between the door and the housing when the door is in the closed position.

17. An electrical extension cord assembly according to claim 10 wherein, when the door is in the closed position, then the door and the housing further define the recess, and the recess as defined by the housing and the door in the closed position is dimensioned to be able to hold a power tool battery.

18. An electrical extension cord assembly according to claim 10 wherein the housing includes an outer portion and an inner portion, and the battery charging assembly is mounted to the inner portion.

19. An electrical extension cord assembly according to claim 18 wherein the inner portion of the housing is flexibly connected to the outer portion by a shock absorber.

20. An electrical extension cord assembly for conducting AC power from an AC mains electrical source to a plurality of corded electrical power tools and for holding and charging the removable battery pack of a cordless electric power tool, the electrical extension cord assembly comprising:
an AC electrical cable having a first end and a second end;
an AC electrical plug electrically connected to the AC electrical cable at a location proximate to the first end, the AC electrical plug connectable to the AC mains electrical source,
a housing located proximate to the second end of the AC electrical cable, the housing including a reel operable for holding substantially all the AC electrical cable;

a plurality of electrical sockets located in the housing and electrically connected to the AC electrical cable at a location proximate to the second end, the plurality of electrical sockets connectable to the corded electrical power tools;

a battery charger located in the housing and electrically connected to the AC electrical cable at a location proximate to the second end, the battery charger including a receptacle adapted for holding and charging the battery pack of the cordless electric power tool; and the housing includes a door and the housing and the door define a recess sized to accommodate the battery pack of the cordless electric power tool, and the battery charger receptacle is located in the recess.

21. An electrical extension cord assembly according to claim 20 wherein the reel is rotatably mounted in the housing and the AC electrical cable is spoolable onto the reel.

* * * * *